United States Patent
Hosur et al.

(10) Patent No.: US 6,891,882 B1
(45) Date of Patent: May 10, 2005

(54) RECEIVER ALGORITHM FOR THE LENGTH 4 CFC

(75) Inventors: Srinath Hosur, Plano, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 410 days.

(21) Appl. No.: 09/649,390

(22) Filed: Aug. 28, 2000

Related U.S. Application Data

(60) Provisional application No. 60/151,178, filed on Aug. 27, 1999, and provisional application No. 60/189,350, filed on Mar. 14, 2000.

(51) Int. Cl.[7] .............................. H04B 1/69; H04B 7/216
(52) U.S. Cl. ........................ 375/147; 375/149; 375/150; 370/342
(58) Field of Search ................................ 375/130, 147, 375/149, 142, 150, 145, 367, 362, 363, 364, 365; 370/335, 342, 441

(56) References Cited

U.S. PATENT DOCUMENTS

| | | | | |
|---|---|---|---|---|
| 6,226,315 B1 | * | 5/2001 | Sriram et al. | 375/140 |
| 6,363,060 B1 | * | 3/2002 | Sarkar | 370/342 |
| 6,504,830 B1 | * | 1/2003 | Ostberg et al. | 370/342 |
| 6,526,091 B1 | * | 2/2003 | Nystrom et al. | 375/142 |

OTHER PUBLICATIONS

Sanat Kama et al., "Comparision of Intial Cell Search Algorithim for W–CDMA System Using Cyclic and Comma Free Codes," 2002, IEEE, pp. 192–195.*

* cited by examiner

*Primary Examiner*—Tesfaldet Bocure
(74) *Attorney, Agent, or Firm*—Carlton H. Hoel; W. James Brady; Frederick J. Telecky, Jr.

(57) ABSTRACT

Decoding CFC codewords in the form of sums of QPSK-modulated spread symbols in a spread spectrum communications systems using comma-free codes with elements made of sums of QPSK-modulated secondary synchronization codes.

11 Claims, 12 Drawing Sheets

| CODE GROUP | CODE SET | FRAME 1 | | | | FRAME 2 | | | | ASSOCIATED $t_{offset}$ |
|---|---|---|---|---|---|---|---|---|---|---|
| | | SLOT k | | SLOT k+8 | | SLOT k | | SLOT k+8 | | |
| 0 | 1 | $c_0$ | $c_1$ | $c_2$ | $c_0$ | $-c_0$ | $-c_1$ | $c_2$ | $-c_0$ | $-c_1$ | $-c_2$ | $t_0$ |
| 1 | 1 | $c_0$ | $-c_1$ | $c_2$ | $c_0$ | $-c_0$ | $c_1$ | $c_2$ | $-c_0$ | $c_1$ | $-c_2$ | $t_1$ |
| 2 | 1 | $jc_0$ | $jc_1$ | $c_2$ | $jc_0$ | $-jc_0$ | $-jc_1$ | $c_2$ | $-jc_0$ | $-jc_1$ | $-c_2$ | $t_2$ |
| 3 | 1 | $jc_0$ | $-jc_1$ | $c_2$ | $jc_0$ | $-jc_0$ | $jc_1$ | $c_2$ | $-jc_0$ | $jc_1$ | $-c_2$ | $t_3$ |
| 4 | 1 | $jc_0$ | $jc_2$ | $c_1$ | $jc_1$ | $-jc_1$ | $-jc_2$ | $c_1$ | $-jc_1$ | $-jc_2$ | $-c_1$ | $t_4$ |
| 5 | 1 | $jc_1$ | $jc_2$ | $c_0$ | $-jc_1$ | $-jc_1$ | $-jc_2$ | $c_0$ | $-jc_1$ | $-jc_2$ | $-c_0$ | $t_5$ |
| 6 | 1 | $jc_1$ | $-jc_2$ | $c_0$ | $-jc_1$ | $-jc_1$ | $jc_2$ | $c_0$ | $-jc_1$ | $jc_2$ | $-c_0$ | $t_6$ |
| 7 | 1 | $c_3$ | $c_4$ | $c_5$ | $c_3$ | $-c_3$ | $-c_4$ | $c_5$ | $-c_3$ | $-c_4$ | $-c_5$ | $t_7$ |
| 8 | 2 | $c_3$ | $-c_4$ | $c_5$ | $c_3$ | $-c_3$ | $c_4$ | $c_5$ | $-c_3$ | $c_4$ | $-c_5$ | $t_8$ |
| 9 | 2 | $jc_3$ | $jc_4$ | $c_5$ | $jc_3$ | $-jc_3$ | $-jc_4$ | $c_5$ | $-jc_3$ | $-jc_4$ | $-c_5$ | $t_9$ |
| 10 | 2 | $jc_3$ | $-jc_4$ | $c_5$ | $jc_3$ | $-jc_3$ | $jc_4$ | $c_5$ | $-jc_3$ | $jc_4$ | $-c_5$ | $t_{10}$ |
| 11 | 2 | $jc_3$ | $jc_5$ | $c_4$ | $jc_3$ | $-jc_3$ | $-jc_5$ | $c_4$ | $-jc_3$ | $-jc_5$ | $-c_4$ | $t_{11}$ |
| 12 | 2 | $jc_3$ | $-jc_5$ | $c_4$ | $jc_3$ | $-jc_3$ | $jc_5$ | $c_4$ | $-jc_3$ | $jc_5$ | $-c_4$ | $t_{12}$ |
| 13 | 2 | $jc_4$ | $jc_5$ | $c_3$ | $jc_4$ | $-jc_4$ | $-jc_5$ | $c_3$ | $-jc_4$ | $-jc_5$ | $-c_3$ | $t_{13}$ |
| 14 | 2 | $jc_4$ | $-jc_5$ | $c_3$ | $jc_4$ | $-jc_4$ | $jc_5$ | $c_3$ | $-jc_4$ | $jc_5$ | $-c_3$ | $t_{14}$ |
| 15 | 3 | $c_6$ | $c_7$ | $c_8$ | $c_6$ | $-c_6$ | $-c_7$ | $c_8$ | $-c_6$ | $-c_7$ | $-c_8$ | $t_{15}$ |
| 16 | 3 | $c_6$ | $-c_7$ | $c_8$ | $c_6$ | $-c_6$ | $c_7$ | $c_8$ | $-c_6$ | $c_7$ | $-c_8$ | $t_{16}$ |
| ... | ... | ... | ... | ... | ... | ... | ... | ... | ... | ... | ... |
| 23 | 3 | $jc_7$ | $-jc_8$ | $c_6$ | $jc_7$ | $-jc_7$ | $jc_8$ | $c_6$ | $-jc_7$ | $jc_8$ | $-c_6$ | $t_{20}$ |
| 24 | 4 | $c_9$ | $c_{10}$ | $c_{11}$ | $c_9$ | $-c_9$ | $-c_{10}$ | $c_{11}$ | $-c_9$ | $-c_{10}$ | $-c_{11}$ | $t_{24}$ |
| ... | ... | ... | ... | ... | ... | ... | ... | ... | ... | ... | ... |
| 31 | 4 | $jc_{10}$ | $-jc_{11}$ | $c_9$ | $jc_{10}$ | $-jc_{10}$ | $jc_{11}$ | $c_9$ | $-jc_{10}$ | $jc_{11}$ | $-c_9$ | $t_{31}$ |

FIG. 1b

| CODE GROUP | CODE SET | FRAME 1 | | | FRAME 2 | | | ASSOCIATED $t_{offset}$ |
|---|---|---|---|---|---|---|---|---|
| 0 | 1 | $c_0$ | $c_1$ | $c_2$ | $c_0$ | $c_1$ | $-c_2$ | $t_0$ |
| 1 | 1 | $c_0$ | $-c_1$ | $c_2$ | $c_0$ | $-c_1$ | $-c_2$ | $t_1$ |
| 2 | 1 | $-c_0$ | $c_1$ | $c_2$ | $-c_0$ | $c_1$ | $-c_2$ | $t_2$ |
| 3 | 1 | $-c_0$ | $-c_1$ | $c_2$ | $-c_0$ | $-c_1$ | $-c_2$ | $t_3$ |
| 4 | 1 | $jc_0$ | $jc_1$ | $c_2$ | $jc_0$ | $jc_1$ | $-c_2$ | $t_4$ |
| 5 | 1 | $jc_0$ | $-jc_1$ | $c_2$ | $jc_0$ | $-jc_1$ | $-c_2$ | $t_5$ |
| 6 | 1 | $-jc_0$ | $jc_1$ | $c_2$ | $-jc_0$ | $jc_1$ | $-c_2$ | $t_6$ |
| 7 | 1 | $-jc_0$ | $-jc_1$ | $c_2$ | $-jc_0$ | $-jc_1$ | $-c_2$ | $t_7$ |
| 8 | 1 | $jc_0$ | $jc_2$ | $c_1$ | $jc_0$ | $jc_2$ | $-c_1$ | $t_8$ |
| 9 | 1 | $jc_0$ | $-jc_2$ | $c_1$ | $jc_0$ | $-jc_2$ | $-c_1$ | $t_9$ |
| 10 | 1 | $-jc_0$ | $jc_2$ | $c_1$ | $-jc_0$ | $jc_2$ | $-c_1$ | $t_{10}$ |
| 11 | 1 | $-jc_0$ | $-jc_2$ | $c_1$ | $-jc_0$ | $-jc_2$ | $-c_1$ | $t_{11}$ |
| 12 | 1 | $jc_1$ | $jc_2$ | $c_0$ | $jc_1$ | $jc_2$ | $-c_0$ | $t_{12}$ |
| 13 | 1 | $jc_1$ | $-jc_2$ | $c_0$ | $jc_1$ | $-jc_2$ | $-c_0$ | $t_{13}$ |
| 14 | 1 | $-jc_1$ | $jc_2$ | $c_0$ | $-jc_1$ | $jc_2$ | $-c_0$ | $t_{14}$ |
| 15 | 1 | $-jc_1$ | $-jc_2$ | $c_0$ | $-jc_1$ | $-jc_2$ | $-c_0$ | $t_{15}$ |
| 16 | 2 | $c_3$ | $c_4$ | $c_5$ | $c_3$ | $c_4$ | $-c_5$ | $t_{16}$ |
| 17 | 2 | $c_3$ | $-c_4$ | $c_5$ | $c_3$ | $-c_4$ | $-c_5$ | $t_{17}$ |
| ⋮ | ⋮ | ⋮ | ⋮ | ⋮ | ⋮ | ⋮ | ⋮ | ⋮ |
| 20 | 2 | $jc_3$ | $jc_4$ | $c_5$ | $jc_3$ | $jc_4$ | $-c_5$ | $t_{20}$ |
| ⋮ | ⋮ | ⋮ | ⋮ | ⋮ | ⋮ | ⋮ | ⋮ | ⋮ |
| 24 | 2 | $jc_3$ | $jc_5$ | $c_4$ | $jc_3$ | $jc_5$ | $-c_4$ | $t_{24}$ |
| ⋮ | ⋮ | ⋮ | ⋮ | ⋮ | ⋮ | ⋮ | ⋮ | ⋮ |
| 31 | 2 | $-jc_4$ | $-jc_5$ | $c_3$ | $-jc_4$ | $-jc_5$ | $-c_3$ | $t_{31}$ |

*FIG. 6*

| CODE GROUP | CODE SET | FRAME 1 | | | | | |
|---|---|---|---|---|---|---|---|
| | | SLOT k | | | SLOT k+8 | | |
| 0 | 1 | $c_0$ | $c_1$ | $c_2$ | $c_0$ | $c_1$ | $-c_2$ |
| 1 | 1 | $c_0$ | $-c_1$ | $c_2$ | $c_0$ | $-c_1$ | $-c_2$ |
| 2 | 1 | $jc_0$ | $jc_1$ | $c_2$ | $jc_0$ | $jc_1$ | $-c_2$ |
| 3 | 1 | $jc_0$ | $-jc_1$ | $c_2$ | $jc_0$ | $-jc_1$ | $-c_2$ |
| 4 | 1 | $jc_0$ | $jc_2$ | $c_1$ | $jc_0$ | $jc_2$ | $-c_1$ |
| 5 | 1 | $jc_0$ | $-jc_2$ | $c_1$ | $jc_0$ | $-jc_2$ | $-c_1$ |
| 6 | 1 | $jc_1$ | $jc_2$ | $c_0$ | $jc_1$ | $jc_2$ | $-c_0$ |
| 7 | 1 | $jc_1$ | $-jc_2$ | $c_0$ | $jc_1$ | $-jc_2$ | $-c_0$ |
| 8 | 2 | $c_3$ | $c_4$ | $c_5$ | $c_3$ | $c_4$ | $-c_5$ |
| 9 | 2 | $c_3$ | $-c_4$ | $c_5$ | $c_3$ | $-c_4$ | $-c_5$ |
| 10 | 2 | $jc_3$ | $jc_4$ | $c_5$ | $jc_3$ | $jc_4$ | $-c_5$ |
| 11 | 2 | $jc_3$ | $-jc_4$ | $c_5$ | $jc_3$ | $-jc_4$ | $-c_5$ |
| 12 | 2 | $jc_3$ | $jc_5$ | $c_4$ | $jc_3$ | $jc_5$ | $-c_4$ |
| 13 | 2 | $jc_3$ | $-jc_5$ | $c_4$ | $jc_3$ | $-jc_5$ | $-c_4$ |
| 14 | 2 | $jc_4$ | $jc_5$ | $c_3$ | $jc_4$ | $jc_5$ | $-c_3$ |
| 15 | 2 | $jc_4$ | $-jc_5$ | $c_3$ | $jc_4$ | $-jc_5$ | $-c_3$ |
| 16 | 3 | $c_6$ | $c_7$ | $c_8$ | $c_6$ | $c_7$ | $-c_8$ |
| ⋮ | ⋮ | ⋮ | ⋮ | ⋮ | ⋮ | ⋮ | ⋮ |
| 31 | 4 | $jc_{10}$ | $-jc_{11}$ | $c_9$ | $jc_{10}$ | $-jc_{11}$ | $-c_9$ |
| 0 | 5 | $c_{12}$ | $c_{13}$ | $c_{14}$ | $c_{12}$ | $c_{13}$ | $-c_{14}$ |
| 1 | 5 | $c_{12}$ | $-c_{13}$ | $c_{14}$ | $c_{12}$ | $-c_{13}$ | $-c_{14}$ |
| 2 | 5 | $jc_{12}$ | $jc_{13}$ | $c_{14}$ | $jc_{12}$ | $jc_{13}$ | $-c_{14}$ |
| ⋮ | ⋮ | ⋮ | ⋮ | ⋮ | ⋮ | ⋮ | ⋮ |
| 31 | 8 | $jc_5$ | $-jc_8$ | $c_0$ | $jc_5$ | $-jc_8$ | $-c_0$ |
| 0 | 9 | $c_0$ | $c_9$ | $c_{12}$ | $c_0$ | $c_9$ | $-c_{12}$ |
| ⋮ | ⋮ | ⋮ | ⋮ | ⋮ | ⋮ | ⋮ | ⋮ |
| 30 | 32 | $jc_9$ | $jc_{15}$ | $c_7$ | $jc_9$ | $jc_{15}$ | $-c_7$ |
| 31 | 32 | $jc_9$ | $-jc_{15}$ | $c_7$ | $jc_9$ | $-jc_{15}$ | $-c_7$ |

| FRAME 2 | | | | | | ASSOCIATED $t_{offset}$ | ADDITIONAL BITS FROM SCH TRANSPORT CHANNEL |
|---|---|---|---|---|---|---|---|
| SLOT k | | | SLOT k+8 | | | | |
| $-c_0$ | $-c_1$ | $c_2$ | $-c_0$ | $-c_1$ | $-c_2$ | $t_0$ | 000 |
| $-c_0$ | $c_1$ | $c_2$ | $-c_0$ | $c_1$ | $-c_2$ | $t_1$ | 000 |
| $-jc_0$ | $-jc_1$ | $c_2$ | $-jc_0$ | $-jc_1$ | $-c_2$ | $t_2$ | 000 |
| $-jc_0$ | $jc_1$ | $c_2$ | $-jc_0$ | $jc_1$ | $-c_2$ | $t_3$ | 000 |
| $-jc_0$ | $-jc_2$ | $c_1$ | $-jc_0$ | $-jc_2$ | $-c_1$ | $t_4$ | 000 |
| $-jc_0$ | $jc_2$ | $c_1$ | $-jc_0$ | $jc_2$ | $-c_1$ | $t_5$ | 000 |
| $-jc_1$ | $-jc_2$ | $c_0$ | $-jc_1$ | $-jc_2$ | $-c_0$ | $t_6$ | 000 |
| $-jc_1$ | $jc_2$ | $c_0$ | $-jc_1$ | $jc_2$ | $-c_0$ | $t_7$ | 000 |
| $-c_3$ | $-c_4$ | $c_5$ | $-c_3$ | $-c_4$ | $-c_5$ | $t_8$ | 000 |
| $-c_3$ | $c_4$ | $c_5$ | $-c_3$ | $c_4$ | $-c_5$ | $t_9$ | 000 |
| $-jc_3$ | $-jc_4$ | $c_5$ | $-jc_3$ | $-jc_4$ | $-c_5$ | $t_{10}$ | 000 |
| $-jc_3$ | $jc_4$ | $c_5$ | $-jc_3$ | $jc_4$ | $-c_5$ | $t_{11}$ | 000 |
| $-jc_3$ | $-jc_5$ | $c_4$ | $-jc_3$ | $-jc_5$ | $-c_4$ | $t_{12}$ | 000 |
| $-jc_3$ | $jc_5$ | $c_4$ | $-jc_3$ | $jc_5$ | $-c_4$ | $t_{13}$ | 000 |
| $-jc_4$ | $-jc_5$ | $c_3$ | $-jc_4$ | $-jc_5$ | $-c_3$ | $t_{14}$ | 000 |
| $-jc_4$ | $jc_5$ | $c_3$ | $-jc_4$ | $jc_5$ | $-c_3$ | $t_{15}$ | 000 |
| $-c_6$ | $-c_7$ | $c_8$ | $-c_6$ | $-c_7$ | $-c_8$ | $t_{16}$ | 000 |
| ⋮ | ⋮ | ⋮ | ⋮ | ⋮ | ⋮ | ⋮ | ⋮ |
| $-jc_{10}$ | $jc_{11}$ | $c_9$ | $-jc_{10}$ | $jc_{11}$ | $-c_9$ | $t_{31}$ | 000 |
| $-c_{12}$ | $-c_{13}$ | $c_{14}$ | $-c_{12}$ | $-c_{13}$ | $-c_{14}$ | $t_0$ | 001 |
| $-c_{12}$ | $c_{13}$ | $c_{14}$ | $-c_{12}$ | $c_{13}$ | $-c_{14}$ | $t_1$ | 001 |
| $-jc_{12}$ | $-jc_{13}$ | $c_{14}$ | $-jc_{12}$ | $-jc_{13}$ | $-c_{14}$ | $t_2$ | 001 |
| ⋮ | ⋮ | ⋮ | ⋮ | ⋮ | ⋮ | ⋮ | ⋮ |
| $-jc_5$ | $jc_8$ | $c_0$ | $-jc_5$ | $jc_8$ | $-c_0$ | $t_{31}$ | 001 |
| $-c_0$ | $-c_9$ | $c_{12}$ | $-c_0$ | $-c_9$ | $-c_{12}$ | $t_0$ | 010 |
| ⋮ | ⋮ | ⋮ | ⋮ | ⋮ | ⋮ | ⋮ | ⋮ |
| $-jc_9$ | $-jc_{15}$ | $c_7$ | $-jc_9$ | $-jc_{15}$ | $-c_7$ | $t_{30}$ | 111 |
| $-jc_9$ | $jc_{15}$ | $c_7$ | $-jc_9$ | $jc_{15}$ | $-c_7$ | $t_{31}$ | 111 |

FROM FIG. 7a-1

*FIG. 7a-2*

CODE SET 1: $C_0, C_1, C_2$
CODE SET 2: $C_3, C_4, C_5$
CODE SET 3: $C_6, C_7, C_8$
CODE SET 4: $C_9, C_{10}, C_{11}$
CODE SET 5: $C_{12}, C_{13}, C_{14}$
CODE SET 6: $C_0, C_3, C_6$
CODE SET 7: $C_0, C_4, C_7$
CODE SET 8: $C_0, C_5, C_8$
CODE SET 9: $C_0, C_9, C_{12}$
CODE SET 10: $C_0, C_{10}, C_{13}$
CODE SET 11: $C_0, C_{11}, C_{14}$
CODE SET 12: $C_1, C_3, C_7$
CODE SET 13: $C_1, C_4, C_6$
CODE SET 14: $C_1, C_5, C_9$
CODE SET 15: $C_1, C_8, C_{10}$
CODE SET 16: $C_1, C_{11}, C_{12}$
CODE SET 17: $C_1, C_{13}, C_{15}$
CODE SET 18: $C_2, C_3, C_8$
CODE SET 19: $C_2, C_4, C_9$
CODE SET 20: $C_2, C_5, C_6$
CODE SET 21: $C_2, C_7, C_{10}$
CODE SET 22: $C_2, C_{11}, C_{13}$
CODE SET 23: $C_2, C_{12}, C_{15}$
CODE SET 24: $C_3, C_9, C_{13}$
CODE SET 25: $C_3, C_{10}, C_{12}$
CODE SET 26: $C_3, C_{11}, C_{15}$
CODE SET 27: $C_4, C_8, C_{11}$
CODE SET 28: $C_4, C_{10}, C_{14}$
CODE SET 29: $C_5, C_7, C_{11}$
CODE SET 30: $C_5, C_{10}, C_{15}$
CODE SET 31: $C_6, C_9, C_{14}$
CODE SET 32: $C_7, C_9, C_{15}$

FIG. 7b

RECEIVER ALGORITHM FOR THE LENGTH 4 CFC

CROSS-REFERENCE TO RELATED APPLICATIONS

This application claims priority from the following provisional application Ser. Nos. 60/151,178, filed Aug. 27, 1999 and 60/189,350, filed Mar. 14, 2000. Copending application Ser. No. 09/603,325, filed Jun. 26, 2000 discloses related subject matter. These applications have a common assignee.

BACKGROUND OF THE INVENTION

1. Field of the Invention

The invention relates to communications, and more particularly to spread spectrum digital communications and related systems and methods.

2. Background

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) the spread spectrum signal for recovery of the corresponding information. FIG. 2 shows a system block diagram, and FIGS. 3a–3b illustrates pseudo-random code plus a QPSK (quadrature phase-shift keying) encoder. This multiple access is typically called code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while the remaining interfering signals appear noise-like. For example, the interim standard IS-95 for such CDMA communications employs channels of 1.25 MHz bandwidth and a code pulse interval (chip) $T_C$ of 0.8138 microsecond with a transmitted symbol (bit) lasting 64 chips. The recent wideband CDMA (WCDMA) proposal employs a 3.84 MHz bandwidth and the CDMA code length applied to each information symbol may vary from 4 chips to 256 chips. The CDMA code for each user is typically produced as the modulo-2 addition of a Walsh code with a pseudo-random code (two pseudo-random codes for QPSK modulation) to improve the noise-like nature of the resulting signal. A cellular system as illustrated in FIG. 4 could employ IS-95 or WCDMA for the air interface between the base station and the mobile user station.

A spread spectrum receiver synchronizes with the transmitter by code acquisition followed by code tracking. Code acquisition performs an initial search to bring the phase of the receiver's local code generator to within typically a half chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well-known early-late gate principle.

In a multipath situation a RAKE receiver has individual demodulators (fingers) tracking separate paths and combines the results to improve signal-to-noise ratio (SNR), typically according to a method such as maximal ratio combining (MRC) in which the individual detected signals are synchronized and weighted according to their signal strengths. A RAKE receiver usually has a DLL or TDL code tracking loop for each finger together with control circuitry for assigning tracking units to received signal paths. FIG. 5 illustrates a receiver with N fingres.

The UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips. In FDD mode the base station and the mobile user transmit on different frequencies, whereas in TDD mode a time slot may be allocated to transmissions by either the base station (downlink) or a mobile user (uplink). In addition, TDD systems are differentiated from the FDD systems by the presence of interference cancellation at the receiver. The spreading gain for TDD systems is small (8–16), and the absence of the long spreading code implies that the multi-user multipath interference does not look Gaussian and needs to be canceled at the receiver.

In currently proposed UTRA a mobile user performs an initial cell search when first turned on or entering a new cell; this search detects transmissions of base stations on the physical synchronization channel (PSCH) without any scrambling. The initial cell search by a mobile user must determine timing (time slot and frame) plus identify pertinent parameters of the found cell such as scrambling code (s).

For FDD mode the physical synchronization channel appears in each of the 16 time slots of a frame and occupies 256 chips out of the 2560 chips of the time slot. Thus a base station transmitting in the synchronization channel a repeated primary synchronization code of pseudo-noise of length 256 chips modulated by a length 16 comma-free code (CFC) allows a moblie user to synchronize by first synchronizing to the 256-chip pseudo-random code to set slot timing and then using the cyclic shift uniqueness of a CFC to set frame timing. Further, decoding the CFC by the mobile user reveals the scrambling code used by the base station.

In contrast, for TDD mode the physical synchronization channel only appears in one or two time slots per frame, so the length-16-CFC-modulated primary synchronization code does not easily apply. An alternative proposed TDD mode initial cell search employs a sum of a primary synchronization code (PSC) plus six secondary synchronization codes (SSCs); each code is a 256-chip pseudo-noise sequence, and the codes are orthogonal. In this proposal the initial cell search consists of slot synchronization, frame synchronization and code group identification with scrambling code determination. In particular, during slot synchronization the mobile user employs the PSC to acquire slot synchronization to the strongest cell (strongest received base station transmission): the PSC is common to all cells. A single matched filter (or any similar device matched to the PSC) may be used for detection.

Next, the mobile user employs the six SSCs to find frame synchronization and to identify one out of 32 code groups being used by the base station. Each of the six SSCs is modulated by +1 or −1; this implies 5 bits of information to identify which one of 32 possible code groups is used by the found base station (scrambling codes and midambles), and the sixth SSC is modulated by +1 or −1 to identify whether the time slot is the first or second physical synchronization channel slot in the frame (frame synchronization). Each of the six SSCs is scaled by $1/\sqrt{6}$ to make the power of the sum of the six modulated SSCs equal to the power of the PSC.

Lastly, the mobile user determines which of the four scrambling codes in the cell's code group is being used by, for example, correlation on the common control physical channel.

However, this TDD mode proposal has problems including low signal to noise ratio in the sum of the six modulated SSCs.

There is also a problem of efficient decoding within TDD mode proposals.

SUMMARY OF THE INVENTION

The present invention provides TDD mode cell search with comma-free codes from an alphabet of sums of modulated secondary synchronization codes. Preferred embodiments use length 2 or 4 comma-free codes for frames with two time slots for a synchronization channel and non-interleaved or two-level interleaved, respectively.

This has advantages including increased signal-to-noise ratios due to the removal of redundancy.

BRIEF DESCRIPTION OF THE DRAWINGS

The drawings are heuristic for clarity.

FIGS. 1a–1c, show synchronization channel and comma-free codes.

FIGS. 6–7b illustrate comma-free codes.

DETAILED DESCRIPTION OF THE PREFERRED EMBODIMENTS

1. Overview

Preferred embodiment synchronization methods for UTRA-type TDD mode initial cell search use length 2 or 4 (or more) comma-free codes (CFCs) to encode both frame timing and base station code group information plus frame position for interleaved frames. The use of CFCs effectively removes the redundancy of straightforward coding of frame timing and code group in both time slots occupied by the physical synchronization channel. Some preferred embodiments use CFCs with alphabets generated from scaled sums of two or three QPSK-modulated secondary synchronization codes added to a primary synchronization code. Preferred embodiment spread spectrum communication systems incorporate preferred embodiment synchronization methods.

In preferred embodiment communications systems the base stations and the mobile users could each include one or more digital signal processors (DSP's) and/or other programmable devices with stored programs for performance of the signal processing of the preferred embodiment synchronization methods. The base stations and mobile users may also contain analog integrated circuits for amplification of inputs to or outputs from antennas and conversion between analog and digital; and these analog and processor circuits may be integrated on a single die. The stored programs may, for example, be in ROM onboard the processor or in external flash EEPROM. The antennas may be parts of RAKE detectors with multiple fingers for each user's signals. The DSP core could be a TMS320C6x or TMS320C5x from Texas Instruments.

2. Preferred Embodiments with 12 Secondary Synchronization Codes

Figure 1A:
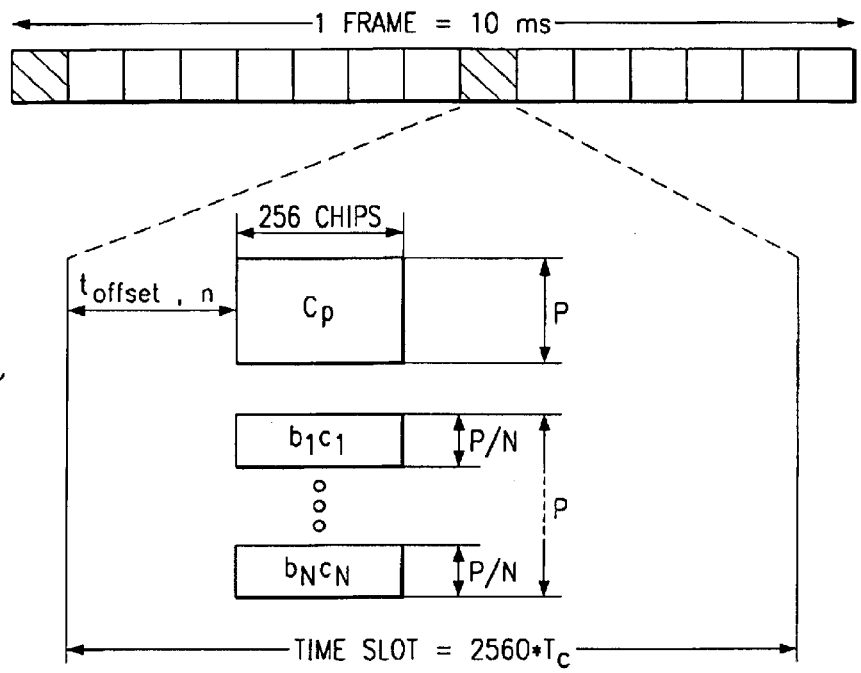
Figure 3A:
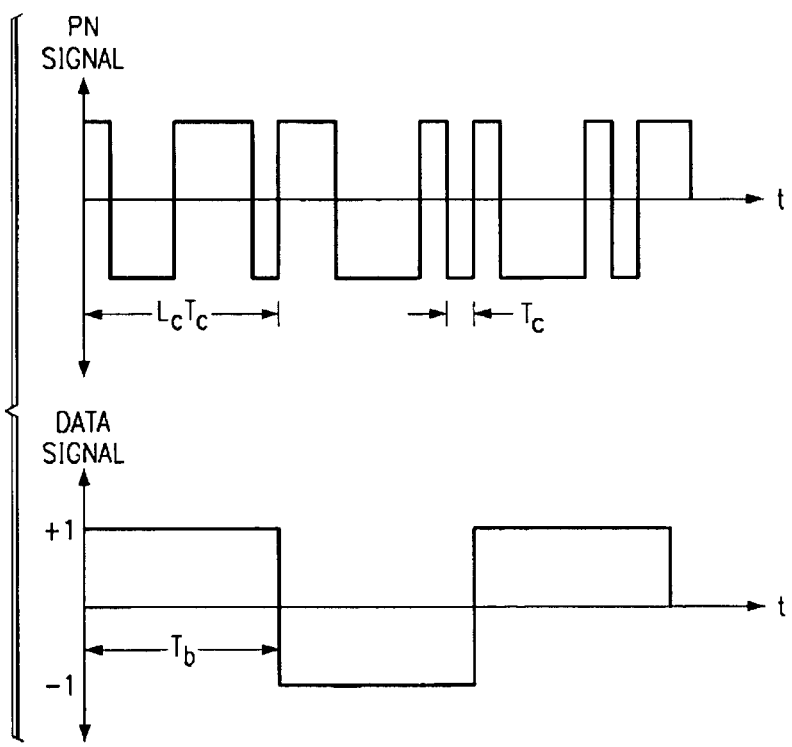
FIGS. 3a–3b illustrate pseudo-random code and symbols.
Figure 2:
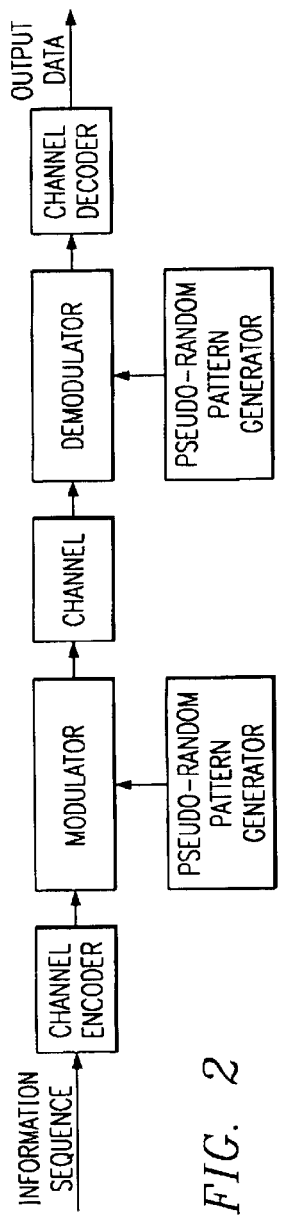
FIG. 2 shows a spread spectrum system.
Figure 5:
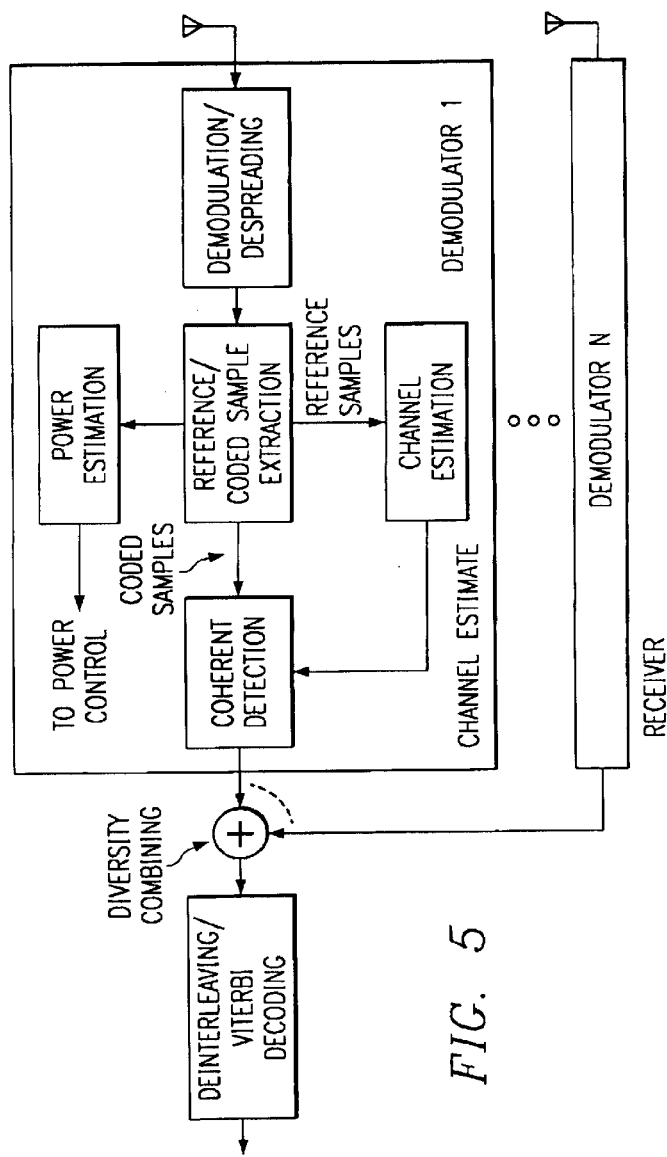
FIGS. 4–5 show a cellular system plus a block diagram of a receiver.
Figure 3B:
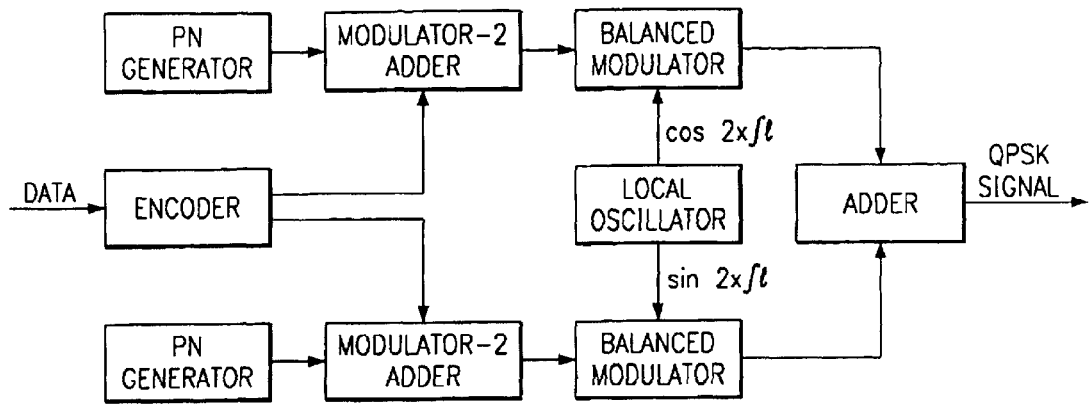
Figure 4:
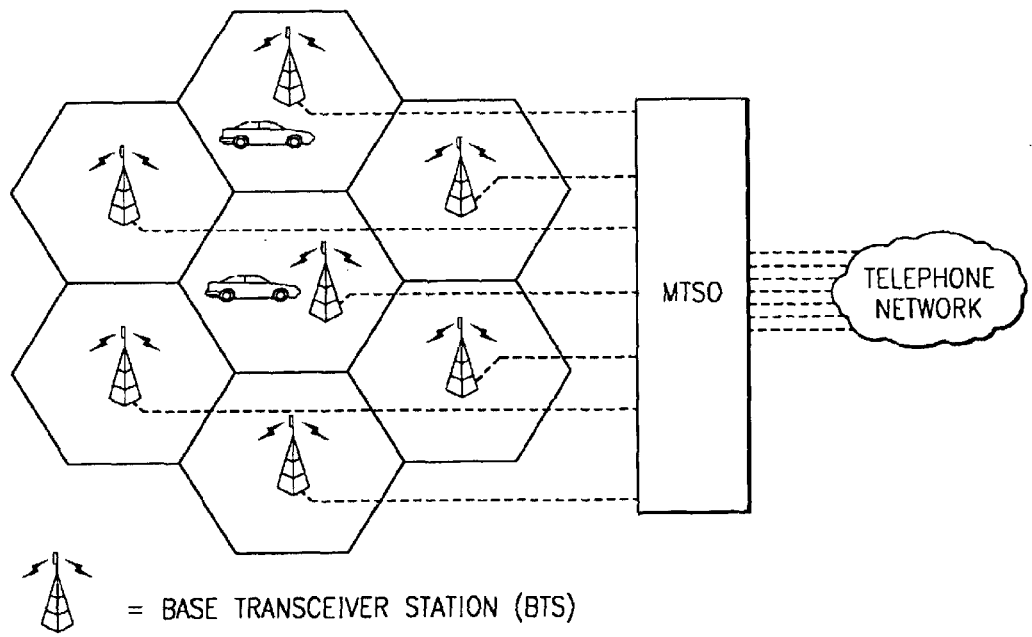
Figure 8:
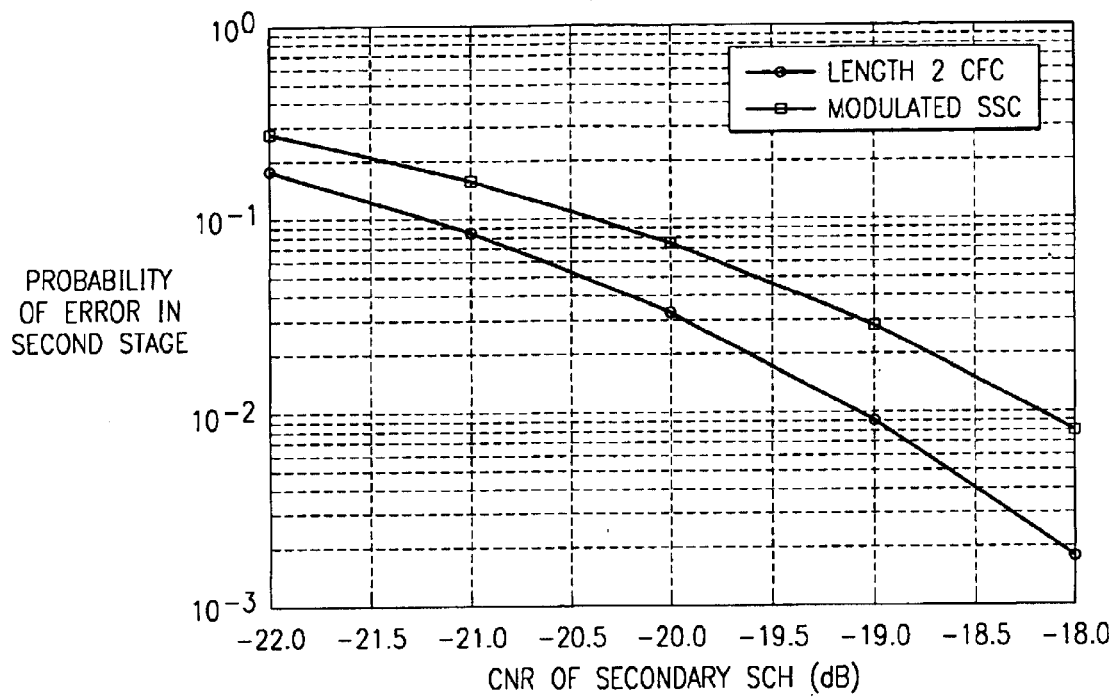
FIGS. 8–15 are simulation results.
Figure 9:
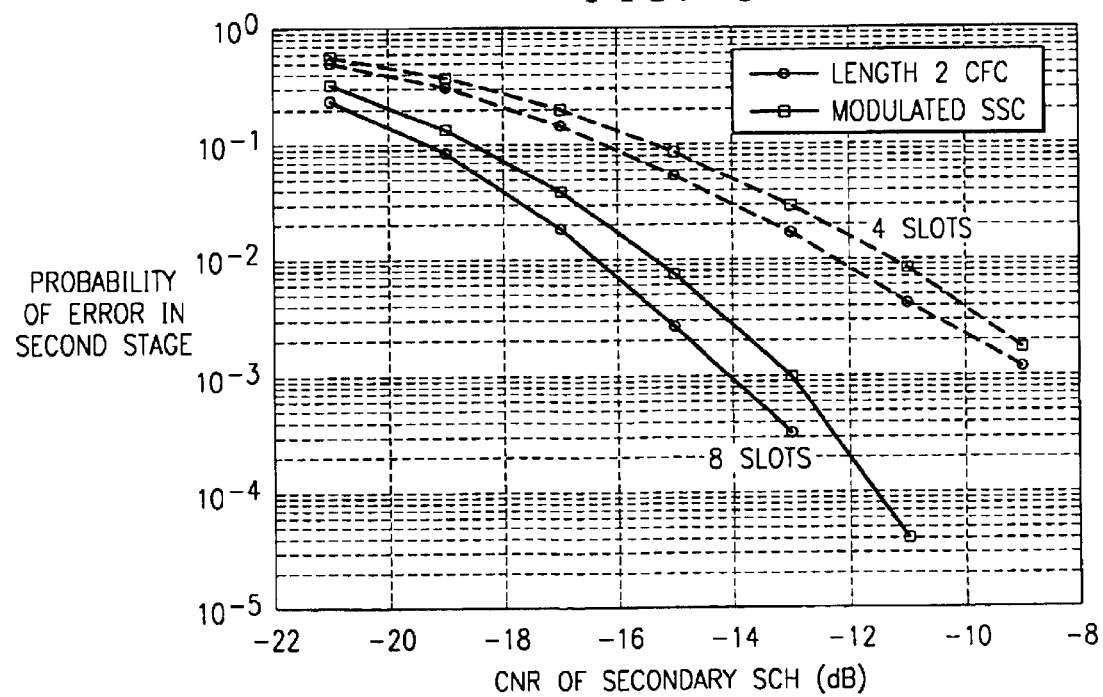
Figure 10:
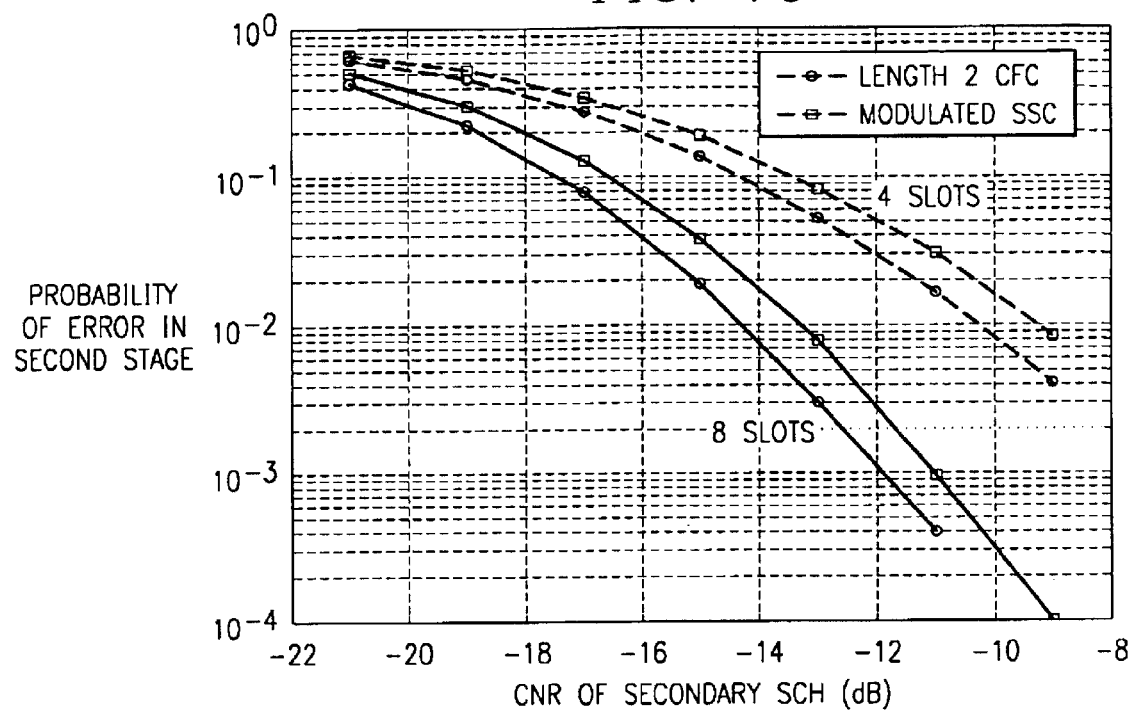
Figure 11:
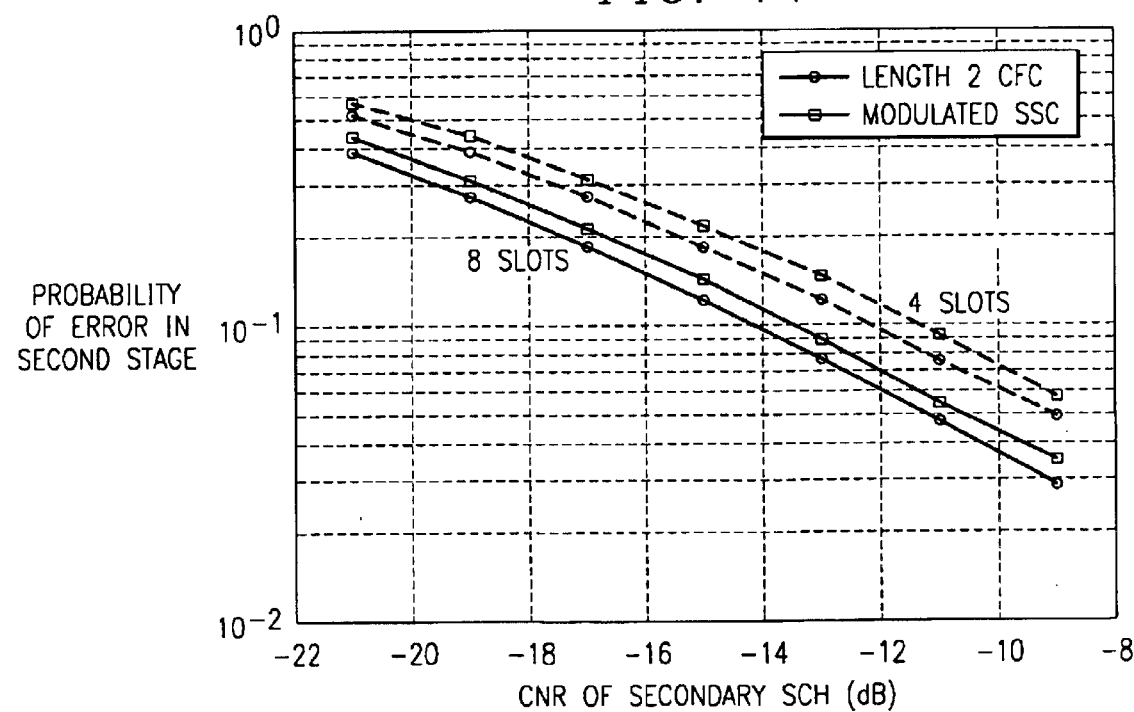
Figure 12:
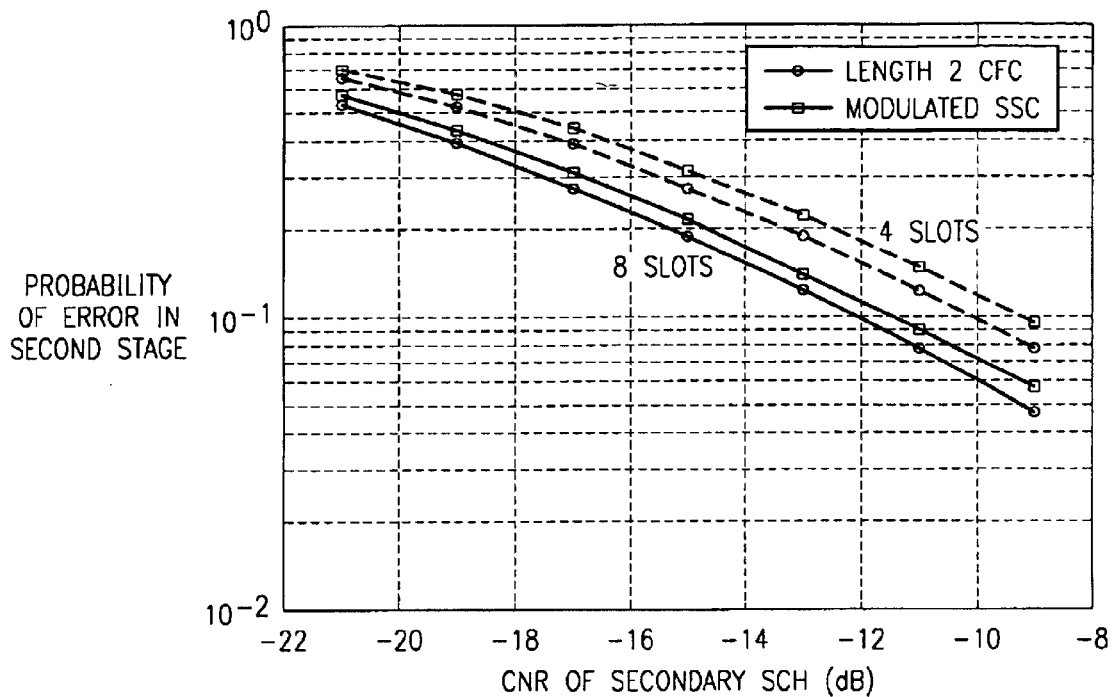
Figure 13:
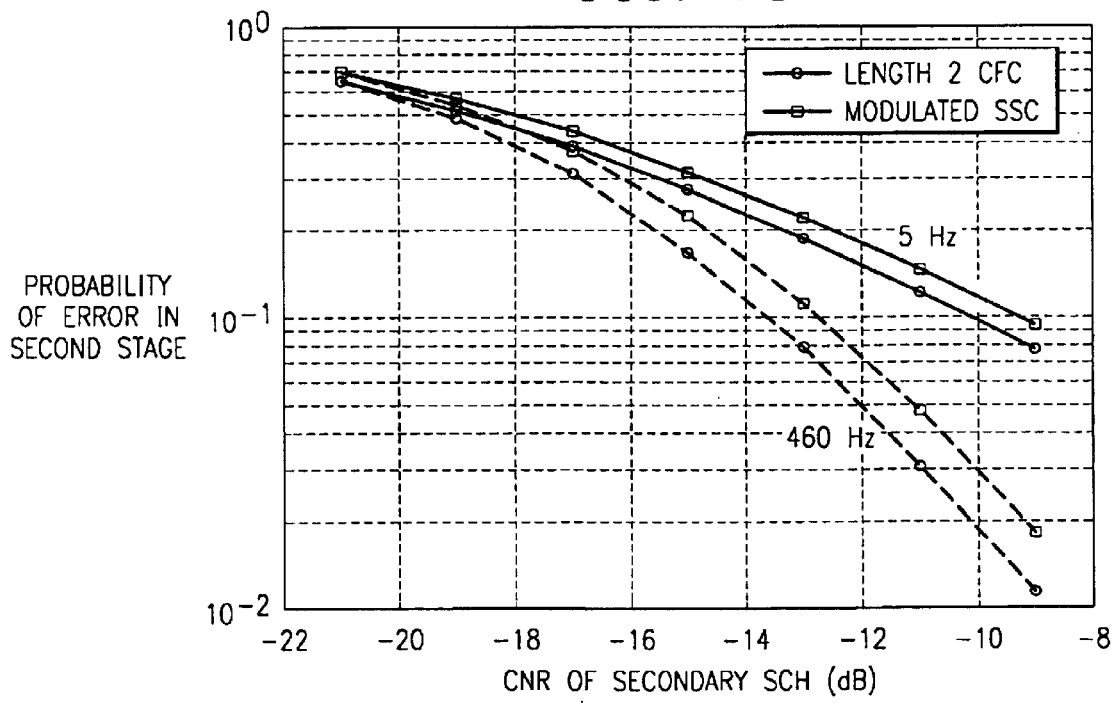
Figure 14:
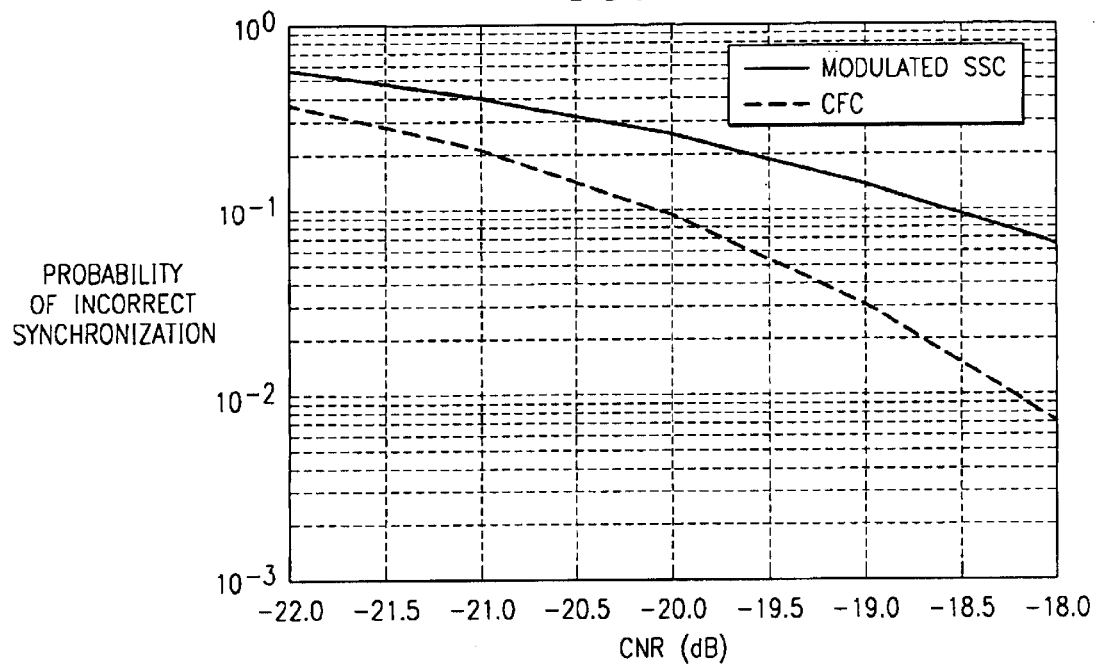
Figure 15:
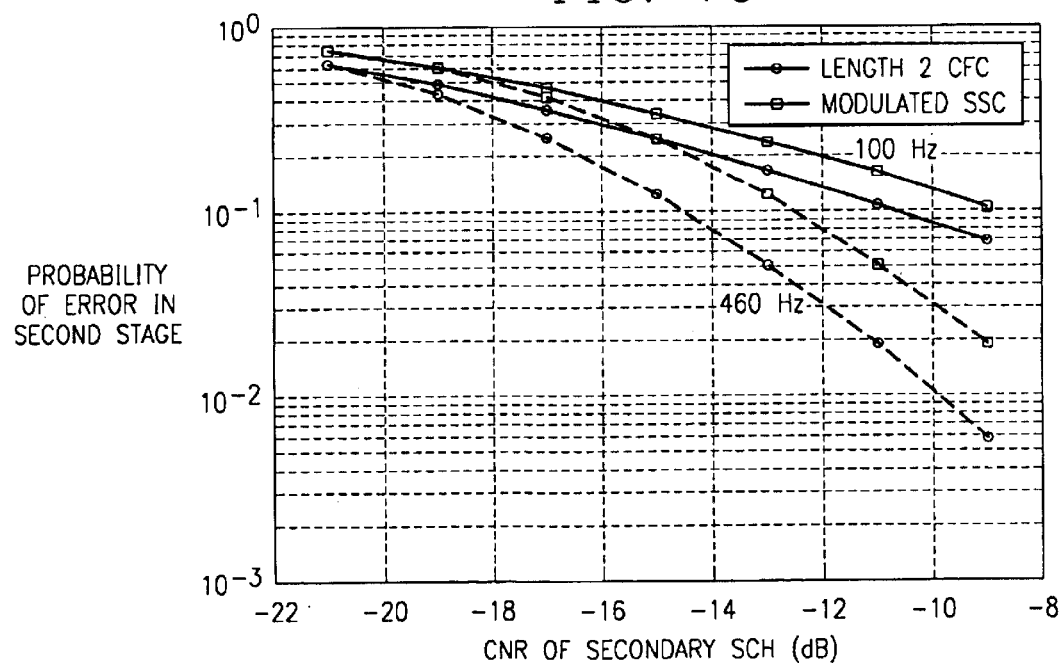

First preferred embodiment initial cell search methods by mobile users in a UTRA system in TDD mode employ the physical synchronization channel as illustrated in FIG. 1a together with two-level frame interleaving. In particular, FIG. 1a shows a 10 ms frame, 15 time slots per frame with 2560 chips per slot; the physical synchronization channel appears in two time slots per frame (namely, slots 0 and 8) and occupies 256 chips in each slot with a time offset from the beginning of the slot. A base station transmits the sum of a 256-chip primary synchronization code $C_p$ plus N (N equals 3 in the example of FIG. 1b) 256-chip secondary synchronization codes cr. CN modulated by QPSK symbols $b_1 \ldots, b_N$ (each $b_1$ is one of $\pm 1, \pm j$) in the synchronization channel. This code set of N secondary synchronization codes {cr. $C_N$} is a subset of {$C_0, C_1, \ldots, C_{11}$}, a set of 12 secondary synchronization codes chosen so that ($C_p, C_0, C_1, \ldots, C_{11}$} form an orthogonal set with each of $C_p, C_0, C_1, \ldots, C_N$ being a 256-chip pseudo-noise sequence of $\pm 1$ components. For example, the $C_i$ could derive from 256-component Gold codes. The transmitted power of each of the modulated secondary synchronization codes is scaled to 1/N of the power of $C_p$, so the power of the sum of the modulated $c_1, \ldots, C_N$ equals the power of $C_p$. Of course, correlation of the sum with $c_k$ recovers $b_k$ due to the orthogonality: of the set {$C_p, C_0, C_1, \ldots, C_{11}$}; that is, $b_k = \sqrt{N} <C_k, C_p + \Sigma b_i c_i / \sqrt{N}>$.

The time offsets vary among the cells and help avoid the interference from neighboring cell synchronization channel transmissions due to all cells broadcasting the same primary synchronization code.

Frames may be interleaved (typically to a depth of 2 or 4) in order to mitigate burst noise. The preferred embodiment CFC has codeword length equal to the number of physical synchronization channel time slots per frame multiplied by the frame interleave depth.

Each cell (base station) belongs to one of 32 code groups (the code group determines which set of four 16-chip scrambling codes contains the scrambling code used by the base station and also determines the time offset of the synchronization channel from the beginning of the time slot). A mobile user must determine the code group during the initial cell search, and the preferred embodiments encode the code group information in a comma-free code with codewords of length 4 using as their alphabet the sums $b_1 c_1 + \ldots + b_N c_N$ described in the preceding paragraph. The length 4 suffices to resolve which of the two time slots per frame and which of two frame positions in a two-level interleaving of frames is detected. Recall that a comma-free code with codewords of length m has the property that for codewords $x = <x(1), x(2), \ldots, x(m)>$ and $y = <y(1), y(2), \ldots, y(m)>$ the sequence $<x(i), x(i+1), \ldots, x(m), y(1), \ldots, y(i-1)>$ is not a codeword if $i > 1$; this includes the case of y=x which are the cyclic shifts of x. Thus the frame timing and frame interleave position information is provided by the comma-free property and the code group information is provided by the modulation code set.

The Table of FIG. 1b lists the 32 code groups and corresponding preferred embodiment comma-free codewords of length 4: the first CFC codeword component is the frame 1, slot k column entries of three $b_i c_i$s to sum, the second component the frame 1, slot k+8 column entries, the third component the frame 2, slot k column entries, and the fourth component the frame 2, slot k+8 column entries. For example, reading the third row for code group 2 shows the sum of three modulated SSCs to add to the PSC is ($jC_0$+

$jC_1+C_2)/\sqrt{3}$ in the first time slot of frame 1, $(jC_0+jC_1-C_2)/\sqrt{3}$ in the second time slot of frame 1, $(-jC_0-jC_1+C_2)/\sqrt{3}$ in the first time slot of frame 2, and $(-C_0-jC_1-C_2)/\sqrt{3}$ in the second time slot of frame 2.

The codewords of FIG. 1b can be generated and implemented as shown in FIG. 1c as follows: for a given code set of three SSCs, e.g., $C_0$, $C_1$, and $C_2$, first form the sum and difference of two of the SSCs: $C_0+C_1$ and $C_0-C_1$. Now form a first codeword of length 4 using the sum $C_0+C_1$ and the third SSC $C_2$ with in phase (real) modulation: $<(C_0+C_1)+C_2, (C_0+C_1)-C_2, -(C_0+C_1)+C_2, -(C_0+C_1)C_2>$. Note that the sign of the sum $(C_0+C_1)$ indicates frame number and the sign of $C_2$ indicates time slot number. Next, form a second codeword by analogy but using the difference $C_0-C_1$ in place of the sum; that is, $<(C_0-C_1)+C_2, (C_0-C_1)-C_2, -(C_0-C_1)+C_2, -(C_0-C_1)-C_2>$. Again, the sign of $(C_0-C_1)$ indicates frame number and the sign of $C_2$ indicates slot number. These two codewords exhaust the 8 possible real coefficient combinations of the code set., $C_0$, $C_1$, and $C_2$; that is, the first codeword used $\pm(C_0+C_1)\pm C_2$.) and the second used $\pm(C_0-C_1)\pm C_2$. Thus for the third and fourth codewords use some quadrature (imaginary) modulation: $j(C_0+C_1)$ and $j(C_0-C_1)$ in place of $C_0+C_1$ and $C_0-C_1$ in the first and second codewords, respectively. That is, the third codeword is $<j(C_0+C_1)+C_2, j(C_0+C_1)-C_2, -j(C_0+C_1)+C_2, -j(C_0+C_1)-C_2>$ and similarly for the fourth codeword using $j(C_0-C_1)$. Note that again the sign of the sum $(C_0+C_1)$ or difference $(C_0-C_1)$ indicates frame number and the sign of $C_2$ indicates time slot number. Next, for the fifth and sixth codewords make the switch $C_1 \leftrightarrow C_2$ in the third and fourth codewords That is, the fifth codeword is $<j(C_0+C_2)+C_1, j(C_0+C_2)-C_1, -j(C_0+C_2)+C_1, -j(C_0+C_2)-C_1>$ and similarly for the sixth codeword using $j(C_0-C_2)$ and $C_1$. Lastly, for the seventh and eighth codewords make the switch $C_0 \leftrightarrow C_1$ in the fifth and sixth codewords to get $<j(C_1+C_2)+C_0, j(C_1+C_2)-C_0, -j(C_1+C_2)+C_0, -j(C_1+C_2)-C_0>$ for the seventh codewords and similarly using $j(C_1-C_2)$ and $C_0$ for the eighth codeword.

The other 24 codewords of FIG. 1b are similarly generated using code sets $\{C_3, C_4, C_5\}$, $\{C_6, C_7, C_8\}$, and $\{C_9, C_{10}, C_{11}\}$.

The time offsets $t_0-t_{31}$ are the 32 equispaced possibilities in the 2208 chips (=2560−256−96 guard portion) in a slot at which the channel could begin, starting at 0. That is, $t_0=0$, $t_1=71$, $t_2=142$, $t_3=213$, . . . , $t_{31}=2201$ chips.

The first preferred embodiment cell search proceeds in three steps as follows.

Step 1: Time Slot Synchronization

During the first step the mobile user employs the primary synchronization code (PSC) to acquire time slot synchronization to the strongest cell (strongest received base station): the PSC is common to all cells and consists of a short pseudo-noise sequence (256 chips). A single matched filter (or any similar device matched to the PSC) is used. Because the physical synchronization channel occupies two slots per 10 ms frame, the slot synchronization should be achieved within about 5 ms. The time offset of the channel within the slot will be determined in step 2.

Step 2. Frame Synchronization and Code-Group Identification Plus Frame Position

During the second step the mobile user employs the secondary synchronization codes (SSCs) to find frame synchronization and identify one out of 32 code groups. Each code group is linked to a time offset of the synchronization channel within the slot, thus to a specific frame timing, and also is linked to a set of four scrambling codes (and basic midambles). To detect the position of the next synchronization slot, correlate PSC with the received signal at both 7 and 8 time slots after the slot detected in step 1. (The 7 and 8 arises because frames have 15 time slots.) The received signal at the positions of the synchronization slots is correlated with the PSC and all of the SSCs. These correlations may be done coherently over one or many time slots with phase correction provided by the correlation with PSC. The correlations recover the set of three $b_i$ modulations for a time slot. Lookup in the table of FIG. 1b yields the code group, time offset of the synchronization channel within the time slot, and the frame timing and interleave position.

Step 3. Scrambling Code Identification

During the third step the mobile user determines which of the four scrambling codes (and basic midambles) in the code group the cell is actually using. This may be by, for example, correlations with all four scrambling codes on the common control channel transmissions by the base station.

Preferred embodiment mobile users would have the PSC and SSCs (and scrambling codes and so forth) stored in memory and be programmed to execute the foregoing cell search.

3. Code Minimum Distance

The correlations in step 2 to find the QPSK modulation symbols $\{b_i\}$ are limited by signal-to-noise factors which relate to the minimum distance between possible codeword components being detected. The general minimum distance between two sums of three SSCs with QPSK modulation (e.g., $\Sigma b_i c_i/\sqrt{3}$ and $\Sigma b_i' c_i/\sqrt{3}$) occurs when two out of the three modulation symbols are equal and when the differing symbols have one real and the other imaginary. Thus the minimum distance is $\sqrt{2}/\sqrt{3}$. Similarly, if the modulation symbols were constrained to be real (e.g., BPSK modulation), six SSCs would be required for the same modulation information, and the minimum distance would be $2/\sqrt{6}=\sqrt{2}/\sqrt{3}$, same as three SSCs with QPSK modulation. Contrarily, as FIG. 1b illustrates, the preferred embodiments use only half of the QPSK modulation possibilities for each code set: either 0 or 2 imaginary modulations are used; never 1 or 3. This increases the minimum distance between CFC codeword components by $\sqrt{2}$ to $2/\sqrt{3}$. Further, FIG. 1b also shows that decoding a single one of the four components of a CFC codeword determines the code group, frame timing, and frame interleave position because each component (set of $b_1$, $b_2$, and $b_3$) appears only once in the table.

However, the preferred embodiments using CFCs create gains over the simple use of sums of modulated SSCs in each time slot because part of the information is in the ordering (in time) of the sums of modulated SSCs (i.e., the ordering of the components of CFC codewords). Indeed, the use of six SSCs modulated by ±1 in both time slots of a frame with one SSC modulation denoting which time slot and the other five modulated SSCs denoting the code group has redundancy in that the five modulated SSCs are repeated.

4. Preferred Embodiments with 6 Secondary Synchronization Codes

The second preferred embodiments apply for a physical synchronization channel with only one time slot per frame and with frame interleaving of depth 2. FIG. 6 shows the codewords using two code sets of three SSCs to encode the 32 code groups. Basically, the first 16 length-4 codewords of FIG. 1b are cut in half to form 32 length-2 codewords of FIG. 6. This means that only two code sets are needed.

Of course, for two time slots per frame without frame interleaving the same codewords could be used.

5. Preferred Embodiments with 16 Secondary Synchronization Codes

The third preferred embodiments apply to two time slots per frame, frame interleave depth of two, plus three additional bits of information for transport channel identified. As shown in FIG. 7a, this increases by a factor of 8 the number of codewords needed compared to FIG. 1b. Note that the codewords are generated from a code set of 3 SSCs in the same manner as for FIG. 1b. Thus the number of code sets is increased to 32 by taking combinations with repeats of 16 SSCs: In particular, the code sets could be as in FIG. 7b.

The preferred embodiment for choosing code sets is as follows. All code sets are to be disjoint subsets of the set $\{C_0, \ldots, C_{15}\}$. The number of code sets depends upon the number of groups to be represented. Each code set can give 8 length-4 comma free codewords. Thus when there are only 32 groups (and therefore 32 codewords), only 4 code sets are required, and choosing 4 disjoint subsets of $(C_0, \ldots, C_{15})$ is easy. For the embodiment where there are 256 codewords, 32 code sets are required. Not all code sets can be disjoint given that there are only 16 SSCs. In order to preserve the minimum distance, therefore allow a maximum of one SSC to be the same among any two code sets taken together. For example, $\{C_0, C_1, C_2\}$, $\{C_3, C_4, C_5\}$, AND $\{C_0, C_4, C_6\}$ are among the valid code sets which can be used for this case but $\{C_0, C_4, C_5\}$ is not.

6. Preferred Embodiment Decoding with 16 Secondary Synchronization Codes

The following Matlab program provides a simulation incorporating a preferred embodiment CFC decoding method for the code groups and code sets of FIGS. 7a–7b. The simulation inputs include signal-to-noise ratios, Doppler adjustments (external files), number of time slots of the synchronization channel used for decoding, and the number of simulation iterations. Each iteration randomly picks a code group for encoding and synthesizes signals and channel estimations. In particular, the matrix C for q=16 corresponds to the code sets of FIG. 7b with the subscript incremented by 1. And the 128 by 3 matrix C1 represents the 256 code groups in pairs; the pairs differ by the sign of the second code. For example, the first two lines in FIG. 7a have code groups labeled 0 and 1 with the difference being the sign of C, in each of the four time slots. More generally, if a code set consists of codes A, B, C; then the 8 code groups are, in terms of modulated sums as appear in the four time slots as in FIG. 7a:

$\{A+B+C, A+B-C, -A-B+C, -A-B-C\}$,
$\{A-B+C, A-B-C, -A+B+C, -A+B-C\}$,
$\{jA+jB+C, jA+jB-C, -jA-jB+C, -jA-jB-C\}$,
$\{jA-jB+C, jA-jB-C, -jA+jB+C, -jA+jB-C\}$,
$\{jA+jC+B, jA+jC-B, -jA-jC+B, -jA-jC-B\}$,
$\{jA-jC+B, jA-jC-B, -jA+jC+B, -jA+jC-B\}$,
$\{jB+jC+A, jB+jC-A, -jB-jC+A, -jB-jC-A\}$,
$\{jB-jC+A, jB-jC-A, -jB+jC+A, -jB+jC-A\}$,

Note each code group has the same internal sign change pattern from first to second to third to fourth elements. The corresponding four rows (three columns) of C1 would be

| A | B | C |
| A | B | C |
| A | C | B |
| B | C | A |

```
function pd_list = cfc_new(snr_list,num_slots,max_iter,fd,q,ng,foff)
if ng == 256
    if q == 30
        C = [1 2 3;4 5 6;7 8 9;10 11 12;13 14 15;16 17 18;19 20 21;
            22 23 24;25 26 27;28 29 30;1 4 7;10 13 16;19 22 25;2 5 8;
            11 14 17;20 23 26;3 6 9;12 15 18;21 24 27;1 5 9;7 11 15;
            13 17 21;16 20 24;19 23 27;22 26 30;3 5 7;6 8 10;9 11 13;
            12 14 16;18 20 22;21 23 25;24 26 28];
    elseif q==16
        C = [1 2 3; 4 5 6; 7 8 9; 10 11 12; 13 14 15; 1 4 7; 1 5 8; 1 6 9;
            1 10 13; 1 11 14; 1 12 15; 2 4 8; 2 5 7; 2 6 10; 2 9 11;
            2 12 13; 2 14 16; 3 4 9; 3 5 10; 3 6 7; 3 8 11; 3 12 14;
            3 13 16; 4 10 14; 4 11 13; 4 12 16; 5 9 12; 5 11 15; 6 8 12;
            6 11 16; 7 10 15; 8 10 16];
    else
        error('Only q=16 or q=30 currently');
    end
    C1 = nchoosek(C(1,:),2);
    C1 = [C1 flipud(C(1,:)')];
    C1 = [C1(1,:); C1];
    for k=2:32
        Ck = nchoosek(C(k,:),2);
        Ck = [Ck flipud(C(k,:)')];
        Ck = [Ck(1,:); Ck];
        C1 = [C1; Ck];
    end
else
    error('Only 256 group case currently');
end
snr_list = 10.^(snr_list/10);
switch(fd)
    case 0
        rayl_ch = ones(1,20);
    case 5
        load /db/wcdma/200_Hz/fading_5_hz/old_sig_1.mat
        rayl_ch = old_sig_1.';
        clear old_sig_1;
        ch_len = length(rayl_ch);
    case 20
        load /home/hosur/Matlab/CDMA/WCDMA/Nchmodel/
        Doppler_20/rayl_sig
    case 40
        load /home/hosur/Matlab/CDMA/WCDMA/Nchmodel/
        Doppler_40/rayl_sig
    case 80
        load /home/hosur/Matlab/CDMA/WCDMA/Nchmodel/
        Doppler_80/rayl_sig
    case 100
        %load /home/hosur/Matlab/CDMA/WCDMA/Nchmodel/
        Doppler_100/rayl_sig
        %load
%/db/wcdma/32_KSPS/fading_1000_hz/NON_POW_CTRL/
non_pow_ctrl_data_1_1.mat
        load /db/wcdma/200_Hz/fading_100_hz/old_sig_1.mat
        %rayl_ch = old_sig_1(1:16:500000).';
        rayl_ch = old_sig_1.';
        clear old_sig_1;
        ch_len = length(rayl_ch);
        %load /home/hosur/Matlab/CDMA/WCDMA/Nchmodel/
        Doppler_100/rayl_sig
    case 460
        load /home/hosur/Matlab/CDMA/WCDMA/Nchmodel/
        Doppler_460/rayl_sig
    case 1000
        rayl_ch = ones(1,20);
    otherwise
        error('Unknown Doppler Frequency');
end
if (fd~=0)&(fd ~= 5)&(fd ~=100)
    ch_len = length(rayl_ch);
    rayl_ch = rayl_ch(:,1:20:ch_len); % subsample to get it at
    16 ksps
    ch_len = length(rayl_ch):
end
sc_rat = 0.5;
ssc_rat = sqrt(sc_rat);
pd_list=[ ];
tdec = [ ];
tpr = [ones(1,ceil(num_slots/4)); -ones(1,ceil(num_slots/4))];
tpr = reshape(tpr,1,prod(size(tpr)));
tpr = repeat(tpr,2);
eval(['load cr_corr_'int2str(q) '_' int2str(foff) 'khz.mat']);
pp = pscc(1);
pscc = pscc(2:q+1,:);
psc = pscc.';
for snr = snr_list
    snr
    pd=0;
    ssc_rat_sc = sqrt(snr)*ssc_rat;
    for iter = 1:max_iter
```

```
            index = ceil(rand*ng);
            if index == 0
                index = 1;
            end
            cyc = ceil(rand*4);
            if cyc == 0
                cyc = 1;
            end
            %index = 1;
            %cyc=2;
            if (fd ~= 0)&(fd ~=1000)&(fd~=5)&(fd~=100)
                start = ceil(rand*(ch_len-8*num_slots));
                if start == 0
                    start = 1;
                end
                fading = rayl_ch(1,start:8:start+8*num_slots-1);
            elseif (fd==5)|(fd==100)
                start = ceil(rand*(ch_len-num_slots));
                if start == 0
                    start = 1;
                end
                fading = rayl_ch(1,start:start+num_slots-1);
            elseif fd == 0
                fading = ones(1.num_slots);
            elseif fd == 1000
                fading = (randn(1,num_slots)+j*randn(1,num_slots))/
                    sqrt(2);
            end
            %C(index,:);
            %size(pscc)
            k1 = ceil(index/2);
            k2 = mod((index-1),2);
            k3 = mod(k1-1,4);
            tp = 1-2*bin_state(k2,2);
            tv = sscc(:,C1(k1,:));
            tva = tv(:,[1,2])*tp(ones(q,1),:);
            if k3
                tva = tva*j;
            end
            tva = sum(tva,2);
            tvb = tv(:,3);
            %disp('heh')
            out_var = zeros(q,num_slots);
            tv = zeros(q,4);
            tpr1 = [tpr(cyc:length(tpr)) tpr(1:cyc-1)];
            tpr1 = tpr1(1:num_slots);
            for nk = 1:4
                ttem = tpr1(nk)*tva+((-1)^(nk+cyc))*tvb;
                out_var(:,nk:4:num_slots) = ttem(:,ones(1,num_slots/4));
            end
            tv = ssc_rat_sc*fading;
            out_var = tv(ones(q,1),:).*out_var/sqrt(3);
            out_var = out_var + ...
                        (1/sqrt(2))*(randn(q,num_slots)+j*randn(q,
                        num_slots));
            ch_est = zeros(1,num_slots);
            tv = psc(C1(k1,:));
            tva = tv([1,2]).*tp;
            if k3
                tva = tva*j;
            end
            tva = sum(tva);
            tvb = tv(3);
            for nk = 1:4
                ch_est(1,nk:4:num_slots) =
                    tpr1(nk)*tva+((-1)^(nk+cyc))*tvb;
            end
            ch_est = (sqrt(sc_rat*snr)*pp + ssc_rat_sc*ch_est/
            sqrt(3)).*fading ...
                        +sqrt(0.5)*(randn(1,num_slots)+j*randn(1,
                        num_slots));
            ch_est = ch_est./abs(ch_est);
            %ch_est = fading;
            % Now we receive the Comma Free Code and decide.
            N = conj(ch_est(ones(q,1),:)).*out_var;
            N1 = N(:,1:4:num_slots)+N(:,2:4:num_slots)-N(:,3:4:
                num_slots)- . . . N(:,4:4:num_slots);
            N2 = N(:,1:4:num_slots)-N(:,2:4:num_slots)-N(:,3:4:
                num_slots)+ . . . N(:,4:4:num_slots);
            N3 = N(:,1:4:num_slots)-N(:,2:4:num_slots)+N(:,3:4:
                num_slots)- . . . N(:,4:4:num_slots);
            N3 = real(N3);
            N1 = sum(N1,2);
            N2 = sum(N2,2);
            N3 = sum(N3,2);
            tv = zeros(4*ng,1);
            tj = (mod([0:size(C1,1)-1]',4) > 0)*(-j);
            tj(1:4:length(tj)) = 1;
            %size(tj)
            Nt1 = real(N1(C1(:,[1:2])).*tj(:,ones(1,2)));
            Nt2 = real(N2(C1(:,[1:2])).*tj(:,ones(1,2)));
            Nt3 = N3(C1(:,3));
            tv(1:2:ng) = sum(Nt1,2)+Nt3;
            tv(2:2:ng) = -diff(Nt1,1,2)+Nt3;
            tv(ng+1:2:2*ng) = sum(Nt2,2)-Nt3;
            tv(ng+2:2:2*ng) = -diff(Nt2,1,2)-Nt3;
            tv(2*ng+1:2:3*ng) = -sum(Nt1,2)+Nt3;
            tv(2*ng+2:2:3*ng) = diff(Nt1,1,2)+Nt3;
            tv(3*ng+1:2:4*ng) = -sum(Nt2,2)-Nt3;
            tv(3*ng+2:2:4*ng) = diff(Nt2,1,2)-Nt3;
            dec_var = sum(tv,2);
            [energy,decision] = max(dec_var);
            cyc_h = floor((decision-1)/ng)+1;
            ind_h = decision - ng*(cyc_h-1);
            %[ind_h index cyc_h cyc]
            if (ind_h == index) & (cyc_h == cyc)
                pd=pd+1;
            end
        end
        pd_list = [pd_list pd/max_iter]
    end
    %keyboard
    %eval(['save pd_list_cfcn_' int2str(fd) 'hz_coh pd_list snr_list']);
```

The preferred embodiment CFC decoding method appears in latter portion of the simulation. In particular, the matrix N is a 16 by number-of-time-slots array of correlations of the 16 synchronization codes with the simulation-generated received signals which incorporate a randomly selected code group (the "index" variable in the range of 1 to 256) and has a randomly selected cyclic shift (the "cyc" variable is the slot number in the range 1 to 4 (left to right in FIG. 7a) of the first detected slot). Thus the decoding amounts to finding the values of "index" and "cyc". (Note the subscript offset of 1: codes numbered 1–16 in the simulation correspond to codes $C_0, \ldots C_{15}$ of FIGS. 7a–7b.)

Let N(m,n) be the correlation of the mth synchronization code with the received (simulated) signal in the nth detected time slot of the synchronization channel. The preferred embodiment decoding defines N1, N2, and N3 as the column vectors of sums and differences of correlations over the detected time slots as follows:

$$N1(m)=N(m,1)+N(m,2)-N(m,3)-N(m,4)$$

$$N2(m)=N(m,1)-N(m,2)-N(m,3)+N(m,4)$$

$$N3(m)=N(m,1)-N(m,2)+N(m,3)-N(m,4)$$

Include any correlations for time slot numbers greater than 4 by treating N(m,n) as N(m,n mod 4). Thus N1, N2, N3 are just differing combinations of the correlations over the slots. Note that FIG. 7a illustrates the significance of these +− patterns in the definitions of N1, N2, and N3; namely, for each code group slot k and slot k+8 of frame 1 (corresponding to successive slots in the simulation program) have signs for the first two codes opposite those of slots k and k+8 of frame 2 (which correspond to the next two successive slots in the simulation program). Thus N1 corresponds with frame alignment and N2 with a shift of one slot. Further, the third code has opposite signs in slots k and k+8 in both frames which N3 tracks. That is, if the received signal used a code group of just the qth code with signs ++−−, then N1(q) will roughly be as follows: +4 if the first detected time slot is slot k of frame 1, 0 if the first detected time slot is slot k+8 of frame 1, −4 if the first detected time slot is slot k of frame 2, and 0 if the first detected time slot is slot k+8 of frame 2. Similarly, N2(q) will roughly be 0 if the first detected time slot is slot k of frame 1, +4 if the first detected time slot is slot k+8 of frame 1, 0 if the first detected time slot is slot k of frame 2, and −4 if the first detected time slot is slot k+8 of frame 2.

Next, form the correlation combinations for the code groups of FIG. 7a by defining Nt1, Nt2, and Nt3 as follows. Nt1 is a 128×2 matrix corresponding to the first two columns of the 128×3 code group matrix C1 but with an entry "m" (representing the mth synchronization code) in the kth row of C1 replaced by the real part of either N1 (m) or $-j*N1$ (m), the former if k−1 is a multiple of 4, the latter otherwise. This −j factor counters the j factor appearing in the first two columns of three quarters of the code groups as displayed in FIG. 7a. Note that the tj matrix in the simulation program represents this −j factor incorporation. Similarly, Nt2 is the 128×2 matrix corresponding to first two columns of C1 but with an entry m replaced the real part of either N2(m) or $-j*N2(m)$. Nt3 is the 128×1 matrix corresponding to the third column of C1 with an entry m replaced by real part of N3(m). As FIG. 7a shows no j factors arise for Nt3 because the code groups do not use ±j with the third code. Thus the rows Nt1, Nt2, and Nt3 are the correlations.

Then use Nt1, Nt2, and Nt3 to form a 1024×1 vector of the ± combinations within a code group that appear in FIG. 7a. In particular, a row in C1 corresponds to an adjacent pair of code groups, and each code group has four ± combinations for the four time slots of FIG. 7a. Thus there are 128*8=1024 combinations of correlations to assess. So define for m in the range 1 to 128 (corresponding to rows of C1 and pairs of code groups):

$$tv(2m-1)=Nt1(m,1)+Nt1(m,2)+Nt3(m)$$

$$tv(2m)=Nt1(m,1)-Nt1(m,2)+Nt3(m)$$

$$tv(256+2m-1)=Nt2(m,1)+Nt2(m,2)-Nt3(m)$$

$$tv(256+2m)=Nt2(m,1)-Nt2(m,2)-Nt3(m)$$

$$tv(512+2m-1)=-Nt1(m,1)-Nt1(m,2)+Nt3(m)$$

$$tv(512+2m)=-Nt1(m,1)+Nt1(m,2)+Nt3(m)$$

$$tv(738+2m-1)=-Nt2(m,1)-Nt2(m,2)-Nt3(m)$$

$$tv(738+2m)=-Nt2(m,1)+Nt2(m,2)-Nt3(m)$$

The decoding then simply determines the maximum component value in the tv( ) vector and then component number (the "decision" variable in the program) determines the cyclic shift as cyc=floor((decision−1)/256)+1 and the code group index=decision−256*(cyc−1). The "floor" function is the usual greatest-integer-not-greater-than function, and the code group index runs from 1 to 256 to correspond with the order in the lefthand ("code group") column of FIG. 7a which labels the code groups in 8 intervals of numbers 0 to 31.

Of course, the preferred embodiment decoding method takes advantage of the structure of FIG. 7a, and changing the code structure would lead to a corresponding decoding method adjustment while retaining the formation of matrices of correlations with phase adjustments (± and j factors) combined to form all of the code group correlation sums followed by search for the maximum which yields the cyclic shift and code group indication.

In a more general encoding there could be q synchronization codes and each set of three codes (a code set) gives rise to 64 sums of QPSK-modulated codes (that is, each of the three codes in a code set can have one of 4 modulations: +1, −1, +j, −j, so there are $4^3$ combinations). Thus for length four CFCs with such sums as elements without repetition, there will be 16 possible code groups (4 sums in each code group), and further restriction to code groups with only an even number of ±j modulations in the sums halves the number of code groups to 8 per code set. Similarly, for length 2 CFCs there will be 32 code groups per code set, and further restriction to an even number of j modulations in the sums halves the number to 16 code groups. In fact, FIG. 6 illustrates q=6, length 2 CFCs with two code sets and 32 code groups.

The CFC elements are detected in n time slots (if n is greater than the length of the CFC, then average over the detected time slots modulo the CFC length). Preferred embodiment decoding proceeds with steps such as:

(1) detect the correlations of each of the q synchronization codes with the received baseband signal in each of the n time slots; this yields q*n correlations for n less than or equal to 2 or 4 (CFC lengths). For n greater than 2 or 4 average over time slots modulo 2 or 4 to have q*2 or q*4 correlations. Note that the array N in the foregoing simulation corresponds to these correlations prior to any averaging modulo 4. Denote the correlation with A of the received baseband signal in the first detected time slot (modulo 2 or 4) as N(A,1), the correlation with C in the second detected time slot with C as N(C,2), and so forth. For clarity, first consider length 4.

(2) form signed sums of these correlations. That is, define arrays N1, N2, and N3 as sums over the four time slots with two positive signs and two negative signs:

$$N1(A)=N(A,1)+N(A,2)-N(A,3)-N(A,4)$$

$$N2(A)=N(A,1)-N(A,2)-N(A,3)+N(A,4)$$

$$N3(A)=N(A,1)-N(A,2)+N(A,3)-N(A,4)$$

And similarly for other synchronization codes.

(3) Then define arrays Nt1, Nt2, and Nt3 which are row-indexed by the code groups used in the CFC and with entries corresponding to the N1, N2, and N3 with multipliers for the codes of the row's code group. For example, consider a code set of the three synchronization codes A, B, and C, which leads to 8 code groups including {A+B+C, A+B−C, −A−B+C, −A−B−C}, {jA+jC+B, jA+jC−B, −jA−jC+B, −jA−jC−B}, and so forth. (Such a set of 8 code groups corresponds to 8 adjacent lines in FIG. 7a.) Thus define Nt1 and Nt2 as arrays with two columns (for the first and second codes in a code group) and Nt3 as an array with one column (for the third code in the code group):

$$Nt2(\{A+B+C, A+B-C, -A-B+C, -A-B-C\}, [1,2])=[N2(A),N2(B)]$$

$$Nt2(\{A+B+C, A+B-C, -A-B+C, -A-B-C\}, [1,2])=[N2(A),N2(B)]$$

$$Nt3(\{A+B+C, A+B-C, -A-B+C, -A-B-C\})=N3(C)$$

and $$Nt1(\{jA+jC+B, jA+jC-B, -jA-jC+B, -jA-jC-B\}, [1,2])=[-jN1(A), -jN1(C)]$$

$Nt2(\{jA+jC+B, jA+jC-B, -jA-jC+B, -jA-jC-B\}, [1,2])=[-jN2(A), -jN2(C)]$ $Nt3(\{jA+jC+B, jA+jC-B, -jA-jC+B, -jA-jC-B\})=N3(B)$

That is, for Nt1 and Nt2 the entry for a row is the pair of N1s and N2s corresponding to the two codes which maintain relative modulations within the code group; additionally, apply multipliers to make the first sum of the code group have positive real modulations for these two codes. The Nt3 entry is the N3 for the third code of the code group; this does not need a multiplier because the first sum of the code group always has a +1 modulation for the third code.

(4) for each code group form the 4 sums (which correspond to the first detected time slot falling into one of the four time slots of the length 4 CFC) of the components of Nt1 (or Nt2) plus Nt3. That is, code group $\{A+B+C, \ldots\}$ leads to the four sums

N1(A)+N1(B)+N3(C)
N2(A)+N2(B)-N3(C)
-N1(A)-N1(B)+N3(C)
-N2(A)-N2(B)-N3(C)

and the code group $\{jA+jC+B, \ldots\}$ has the sums:

-jN1(A)-jN1(C)+N3(B)
-jN2(A)-jN2(C)-N3(B)
jN1(A)+jN1(C)+N3(B)
jN2(A)+jN2(C)-N3(B)

(5) find the maximum of the sums of step (4). The code group is that yielding the maximum, and the cyclic shift (the slot number of the first detected slot) is the number in the set of the four sums.

7. Preferred Embodiments without Frame Interleaving

The fourth preferred embodiments apply to synchronization with non-interleaved frames but with 2 (or more) time slots per frame occupied by the physical synchronization channel. In particular, with $C_1, C_2, \ldots, C_6$ being six SSCs, length 2 CFC codewords using QPSK modulation can be formed: $<(C_i+C_k)/\sqrt{2}, (C_i-C_k)/\sqrt{2}>, <-(C_i+C_k)/\sqrt{2}, -(C_i-C_k)/\sqrt{2}>, <j(C_i+C_k)/\sqrt{2}, j(C_i-C_k)/\sqrt{2}>$, and $<-j(C_i+C_k)/\sqrt{2}, -j(C_i-C_k)/\sqrt{2}>$ where $C_i$ and $C_k$ are a pair selected from the set $C_1, C_2, \ldots, C_6$ without replacement. With six SSCs there are 15 pairs $\{C_i, C_k\}$ and thus 60 codewords of the foregoing type.

For the case of two time slots per (non-interleaved) frame and 32 code groups to identify with detection in a single time slot, using six SSCs with BPSK modulation and scaled by $\sqrt{6}$ as previously described, the minimum code distance between two possible detections is $2/\sqrt{6}=0.816$. In contrast, with the foregoing length 2 CFC codewords the frame timing is inherent in the codeword component ($C_i+C_k$ is the first time slot and $C_i-C_k$ the second time slot) and the minimum code distance between two possible detections equals 1. Note that 30 of the 32 codewords needed can be with real (in phase) modulation and only two codewords need imaginary (quaternary) modulation. That is, 30 codewords may be of the form: $<(C_i+C_k)/\sqrt{2}, (C_i-C_k)/\sqrt{2}>$ and $<-(C_i+C_k)/\sqrt{2}, -(C_i-C_k)/\sqrt{2}>$, and only two imaginary modulated codewords need be used, for example, $<j(C_1+C_2)/\sqrt{2}, j(C_1-C_2)/\sqrt{2}>$ and $<-j(C_1+C_2)/\sqrt{2}, -j(C_1-C_2)/\sqrt{2}>$. And reflecting the greater minimum code distance, FIGS. 8–15 illustrate the superior performance of such length 2 CFC codes versus the BPSK-modulated six SSCs.

Further, the computational complexity of the length 2 CFC is comparable to that of the six BSPK-modulated SSCs. In particular, for the six SSCs, 32 correlations are obtained performing length 8 correlations and the Fast Hadamard Transform is applied to these correlation values to obtain the correlations with the 6 SSCs and the PSC, requiring $8\times32+2\times16\times\log_2 16+7=391$ complex additions. Again, the phase of the correlation with the PSC is used as a reference for the correlations with the 6 SSCs. This requires 28 real multiplications and 13 real additions. There are 64 possible combinations (codewords) of the 6 SSCs. Noting that some of these combinations are simply negatives of others and using other redundancies, the 64 combinations require 564 real additions. Averaging the 64 decision variables over K slots requires approximately 64 real additions per slot for large K. Selecting the maximum after averaging over K slots requires (log+2+64)/K compares per slot. This number is the same for both the CFC and the six SSC methods and for large K is very small. So neglect it in the analysis. Thus the six modulated SSC method requires 118 real additons per slot for computing, averaging the decision variables and selecting the maximum.

For the CFC, the multiplication by j is imply flipping the imaginary and real parts. Also, as noted above using $\pm<(C_i+C_k)/\sqrt{2}, (C_i-C_k)/\sqrt{2}>$ produces 30 codewords so only $\pm j<(C_1+C_2)/\sqrt{2}, (C_1-C_2)/\sqrt{2}>$ are needed to complete the 32 required codewords. Again noting that some of these combinations re simply negatives of the others, the method requires 32 additions per slot to obtain the 64 decision variables. Averaging the 64 decision variables over K slots requires approximately 64 real additions per slot for large K. Again neglecting the compares required for selecting the maximum, which is the same for both methods, the length 2 CFC method requires 96 real additions per slot for computing, averaging the decision variables, and selecting the maximum.

8. Modifications

The preferred embodiments may be modified in various ways while retaining the features of comma-free codes (CFC) for synchronization in TDD systems. For example, the modulations $b_i$ can be chosen from the set $\{e^{j\theta}e^{j\theta+j\pi/2}e^{j\theta+j\pi}e^{j\theta+j3\pi/2}\}$. In the preferred embodiment choosing $b_i$ from the set $\{+1+j-1-j\}$ is equivalent to setting $\theta=0$.

Also, if the length-4 comma free code from the preferred embodiment is represented as $\{s_1\ s_2\ s_3\ s_4\}$ where $s_{k=\Sigma b_i c_i}/\sqrt{N}$, any permutation of this code is also a comma free code, e.g. $\{s_2\ s_4\ s_3\ s_1\}$, which is one such permutation, is also a comma free code. This implies that one can achieve the same comma free code performance by transmitting $\{s_2\ s_4\ s_3\ s_1\}$ in sequence instead of $\{s_1\ s_2\ s_3\ s_4\}$.

And for two length-4 comma free codes from the preferred set, say $\{s_1\ s_2\ s_3\ s_4\}$ and $\{g_1\ g_2\ g_3\ g_4\}$, then the codes formed by swapping any two elements between the two code words also form two length-4 CFC's, e.g. $\{s_1\ g_2\ s_3\ s_4\}$ and $\{g_1\ g_3\ s_2\ g_4\}$ are also valid comma free codewords which can be used instead of $\{s_1\ s_2\ s_3\ s_4\}$ and $\{g_1\ g_2\ g_3\ g_4\}$. Swapping the elements between three codewords forms a new set of three comma free codewords.

Further, using the construction method for CFCs made from two or three parallel SSCs, one can construct other CFC's with four or more SSC's in parallel. Analogously, one can easily increase the length of the comma free codewords by concatenating two comma free codewords or portions of two comma free codewords. Similarly splitting the comma free codewords can also decrease the length.

Note that the use of comma-free codes for TDD permits all time slots (of the synchronization channel) contribute to the distance between codewords to avoid the problem of loss of diversity leading to a loss of codeword separation distance.

What is claimed is:

1. A method for decoding received sums of QPSK-modulated spreading codes corresponding to elements of CFC codewords, comprising:

(a) despreading received sums of QPSK-modulated spreading codes with each of said spreading codes;

(b) forming linear combinations with coefficients $\pm 1$ and $\pm j$ of the results of step (a), said combinations corresponding to possible sums as elements of CFC codewords;

(c) finding the maximum of said combinations of step (b);

(d) determining a codeword and cyclic shift from the results of step (c).

2. The method of claim 1, wherein:

(a) said sums of step (a) of claim 1 are each sums of three QPSK-modulated spreading codes.

3. The method of claim 2, wherein:

(a) said sums of step (a) of claim 2 are selected from the group consisting of the sums indicated in slot columns of FIG. 1$b$ wherein $C_0, C_1, \ldots, C_{11}$ represent said spreading codes.

4. The method of claim 2, wherein:

(a) said sums of step (a) of claim 2 are selected from the group consisting of the sums indicated in the slot columns of FIG. 6 wherein $C_0, C_1, \ldots, C_5$ represent said spreading codes.

5. The method of claim 2, wherein:

(a) said sums of step (a) of claim 2 are selected from the group consisting of the sums indicated in the slot columns of FIG. 7$a$ wherein $C_0, C_1, \ldots, C_{15}$ represent said spreading codes.

6. The method of claim 1, wherein:

(a) said sums of step (a) of claim 1 are in time slots of a time-division-duplex transmission.

7. A method for frame synchronization in a time-division duplex code division multiple access system, comprising:

(a) correlating, with each of a set of synchronization codes, received linear combinations of said synchronization codes in time slots, said linear combinations elements of an alphabet for codewords of a common-free code (CFC);

(b) determining a codeword from the results of step (a);

(c) determining frame synchronization from the results of step (b).

8. The method of claim 7, wherein:

(a) said linear combinations of step (a) of claim 7 are selected from the group of linear combinations of the form $b_1 c_1 + b_2 c_2 + b_3 c_3$ where each of said $b_1, b_2,$ and $b_3$ is equal to one of $\pm 1$ or $\pm j$, and where each of said $c_1, c_2,$ and $c_3$ is selected from said set of synchronization codes.

9. The method of claim 8, wherein:

(a) said codewords of step (a) of claim 7 have length 4; and (b) said linear combinations of step (a) of claim 8 are indicated in FIG. 1$b$ where said $C_0, C_1, \ldots, C_{11}$ represent said set of synchronization codes.

10. The method of claim 8, wherein:

(a) said codewords of step (a) of claim 7 have length 2; and (b) said linear combinations of step (a) of claim 8 are indicated in FIG. 6 where said $C_0, C_1, \ldots, C_5$ represent said set of synchronization codes.

11. The method of claim 8, wherein:

(a) said codewords of step (a) of claim 7 have length 4; and (b) said linear combinations of step (a) of claim 8 are indicated in FIG. 7$a$ where said $C_0, C_1, \ldots, C_{15}$ represent said set of synchronization codes.

* * * * *